No. 813,502. PATENTED FEB. 27, 1906.
A. KRAHN.
DRAFT EQUALIZER.
APPLICATION FILED AUG. 28, 1905.
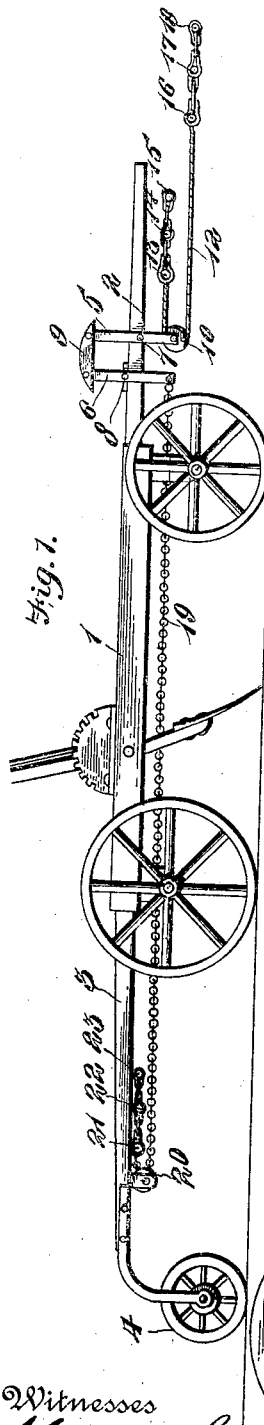
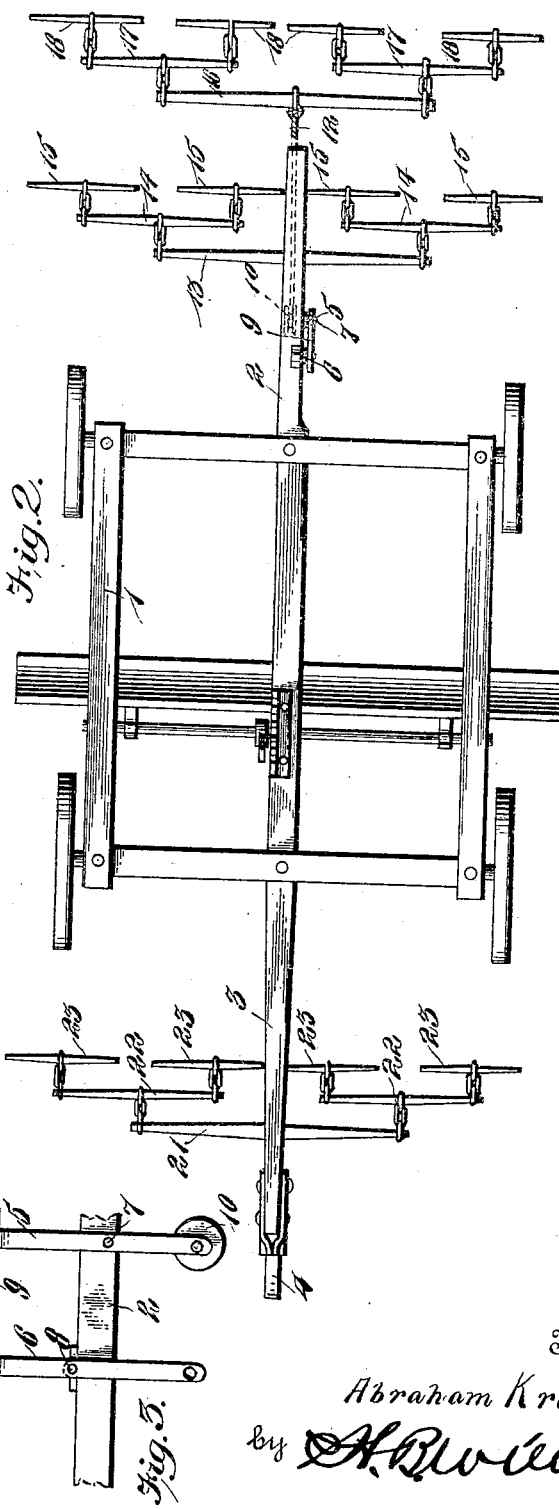
Witnesses
Forrest L. Smith
C. H. Griesbauer
Inventor
Abraham Krahn
by H. B. Wilson
Attorney

UNITED STATES PATENT OFFICE.

ABRAHAM KRAHN, OF LANGDON, NORTH DAKOTA.

DRAFT-EQUALIZER.

No. 813,502.

Specification of Letters Patent.

Patented Feb. 27, 1906.

Application filed August 28, 1905. Serial No. 276,105.

*To all whom it may concern:*

Be it known that I, ABRAHAM KRAHN, a citizen of the United States, residing at Langdon, in the county of Cavalier and State of North Dakota, have invented certain new and useful Improvements in Draft-Equalizers; and I do declare the following to be a full, clear, and exact description of the invention, such as will enable others skilled in the art to which it appertains to make and use the same.

This invention relates to improvements in draft-equalizers.

The object of the invention is to provide a draft-equalizer whereby teams may be hitched at both the front and rear ends of the vehicle and by which means the draft will be equally distributed to all of the teams.

With the above and other objects in view the invention consists of certain novel features of construction, combination, and arrangement of parts, as will be hereinafter described and claimed.

In the accompanying drawings, Figure 1 is a side elevation of a road-grading machine, showing the application of the invention thereto. Fig. 2 is a plan view of the same; and Fig. 3 is an enlarged detail side view of a portion of the front pole or tongue, showing the arrangement of the equalizing-levers pivotally connected thereto.

Referring more particularly to the drawings, 1 denotes a road-grading machine the forward end of which is attached to the front pole or tongue 2 and to the back end of which is attached the rearwardly-projecting back pole or tongue 3, on the outer end of which is journaled a supporting-wheel 4.

Pivotally connected to the front pole or tongue 2 is a pair of vertically-disposed equalizing-levers 5 and 6, the lever 5 being pivoted to the tongue or pole adjacent to the lower side of the same, as shown at 7, while the lever 6 is pivotally connected to the tongue adjacent to the upper side of the same, as shown at 8. The levers 5 and 6 are pivotally connected at their upper ends by means of a cross-bar 9. In the lower end of the lever 5 is journaled a guide-pulley 10, through which is adapted to pass a chain or cable 12, to the end of the upper stretch of which is connected the draft tree or bar 13. The ends of said bar project to an equal distance on each side of the pole or tongue, and to said projecting ends are connected whiffletrees 14, to the ends of which are connected swingletrees 15, by which a team of horses are hitched on each side of the pole or tongue 2. The end of the lower stretch of the chain or cable 12 extends beyond the end of the pole or tongue 2, and to said extended end of the cable is connected a draft tree or bar 16, said cable being connected midway between the ends of said bars, as shown. To the ends of the bars 16 are connected whiffletrees 17, and to the ends of said whiffletrees are connected swingletrees 18, to which two teams may be hitched, thus providing for the attachment of eight horses to the forward end of the machine or other vehicle to which the invention is applied.

Connected to the lower end of the lever 6 is the forward end of a chain or cable 19, said chain or cable passing rearwardly beneath the rear tongue or pole of the vehicle, the end of the cable passing upwardly and around a guide-pulley 20, which is journaled on the under side of the back pole adjacent to the rear end of the same. The end of the chain or cable 19 after passing over and around the pulley 20 extends forwardly and has connected thereto the rear draft tree or bar 21, said draft-bar being connected to said cable midway between its ends, as shown. To the ends of the draft-bar 21 are connected whiffletrees 22, and to the ends of said whiffletrees are connected swingletrees 23, by which a team of horses may be hitched on either side of the back pole or tongue and in rear of the machine or vehicle 1.

By means of a draft-equalizer constructed and arranged as herein shown and described any number of teams may be connected to a vehicle or machine, and the draft of the same will be evenly distributed to all of said teams.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A draft-equalizer adapted to be arranged to permit draft-teams to be connected to the front and rear of a vehicle or machine, and the draft evenly distributed to all the teams, substantially as described.

2. In a draft-equalizer, the combination with pivotally-mounted equalizing-levers, of a front draft-cable adapted to be slidably engaged with the end of one of said levers, draft devices connected to the ends of said cable, and means whereby draft-teams may be hitched at the rear end of the vehicle or machine and connected with the other equalizing-lever, substantially as described.

3. In a draft-equalizer, the combination with pivotally-mounted equalizing-levers of a front draft-cable adapted to be slidably engaged with the end of one of said levers, draft devices connected to the ends of said cable, draft devices arranged in the rear of said vehicle or machine and a sliding connection between said rear draft devices and the end of the other equalizing-lever, substantially as described.

4. In a draft-equalizer, the combination with a pair of equalizing-levers pivotally mounted on the front tongue or pole of the vehicle or machine, a cross-bar pivotally connecting one end of said levers, a guide-pulley journaled in the opposite end of one of said levers, a draft-cable connected with said pulley, one end of said cable extending beyond the end of said front pole or tongue, draft devices secured to the front and rear ends of said cable, and means connected with the free end of the other equalizing-lever whereby draft-teams may be hitched thereto at the rear of said vehicle or machine, substantially as described.

5. In a draft-equalizer, the combination with a pair of equalizing-levers pivotally mounted on the front tongue or pole of the vehicle or machine, a cross-bar pivotally connecting one end of said levers, a guide-pulley journaled in the opposite end of one of said levers, a draft-cable connected with said pulley, one end of said cable extending beyond the end of said front pole or tongue, draft devices secured to the front and rear ends of said cable, a guide-pulley secured to the rear tongue or pole of the vehicle or machine, a draft-cable connected to the free end of the other equalizing-lever, said cable extending rearwardly and over the guide-pulley on said rear tongue and draft devices connected to the free end of said cable whereby draft-teams may be hitched in the rear of said vehicle or machine, substantially as described.

In testimony whereof I have hereunto set my hand in presence of two subscribing witnesses.

ABRAHAM KRAHN.

Witnesses:
ANDREW ARON,
ARTHUR SPARLING.